(12) United States Patent
Hughes

(10) Patent No.: US 10,301,725 B2
(45) Date of Patent: May 28, 2019

(54) ELECTROCHEMICAL CELL

(71) Applicant: Siemens Aktiengesellschaft, Munich (DE)

(72) Inventor: Timothy Hughes, Wantage (GB)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 15/579,695

(22) PCT Filed: Jun. 10, 2016

(86) PCT No.: PCT/EP2016/063353
§ 371 (c)(1),
(2) Date: Dec. 5, 2017

(87) PCT Pub. No.: WO2016/198637
PCT Pub. Date: Dec. 15, 2016

(65) Prior Publication Data
US 2018/0171489 A1    Jun. 21, 2018

(30) Foreign Application Priority Data

Jun. 10, 2015 (GB) .................................. 1510094.4

(51) Int. Cl.
*C25B 1/00* (2006.01)
*C25B 9/06* (2006.01)
*C25B 1/06* (2006.01)

(52) U.S. Cl.
CPC ................. *C25B 9/06* (2013.01); *C25B 1/00* (2013.01); *C25B 1/06* (2013.01); *Y02E 60/366* (2013.01)

(58) Field of Classification Search
CPC .... C25B 9/06; C25B 1/00; C25B 1/06; Y02E 60/366
See application file for complete search history.

(56) References Cited

U.S. PATENT DOCUMENTS

| | | | |
|---|---|---|---|
| 6,881,308 | B2 | 4/2005 | Denvir et al. |
| 7,169,497 | B2 | 1/2007 | Davis et al. |
| 8,398,842 | B2 | 3/2013 | Aulich et al. |
| 9,005,422 | B2 | 4/2015 | Jiang et al. |
| 9,217,202 | B2 | 12/2015 | Wang et al. |
| 2011/0120880 | A1 | 5/2011 | Jiang et al. |
| 2018/0171487 | A1* | 6/2018 | Timothy et al. .......... C25B 1/00 |

OTHER PUBLICATIONS

Murakami et al., "Electrolytic Synthesis of Ammonia in Molten Salts Under Atmospheric Pressure", J. Amer. Chem. Soc. 125 (2), pp. 334-335 (2003).

Murakami et al., "Electrolytic Ammonia Synthesis from Water and Nitrogen Gas in Molten Salt Under Atmospheric Pressure", Electrochim. Acta 50 (27), pp. 5423-5426 (2005).

(Continued)

*Primary Examiner* — Arun S Phasge
(74) *Attorney, Agent, or Firm* — Schiff Hardin LLP

(57) ABSTRACT

An electrochemical cell has four volumes. A porous anode is provided between a first volume and a second volume. A ground electrode is provided between the second volume (2) and the third volume. A porous cathode is provided between the third volume and the fourth volume.

4 Claims, 1 Drawing Sheet

(56) References Cited

OTHER PUBLICATIONS

Marnellos et al. Synthesis of ammonia at atmospheric pressure with the use of solid state proton conductors. J. Catal. 193, 80-88, .(2000).
Skodra et al. Electrocatalytic synthesis of ammonia from steam and nitrogen at atmospheric pressure. Solid State Ionics 180, 1332-1336 (2009).
Lan et al., "Synthesis of ammonia directly from air and water at ambient temperature and pressure," Nature Scientific Reports, pp. 1-7 (2012).
Giddey et al., "Review of electrochemical ammonia production technologies and materials," International Journal of Hydrogen Energy, vol. 38, No. 34, pp. 14576-14594 (2013).

\* cited by examiner

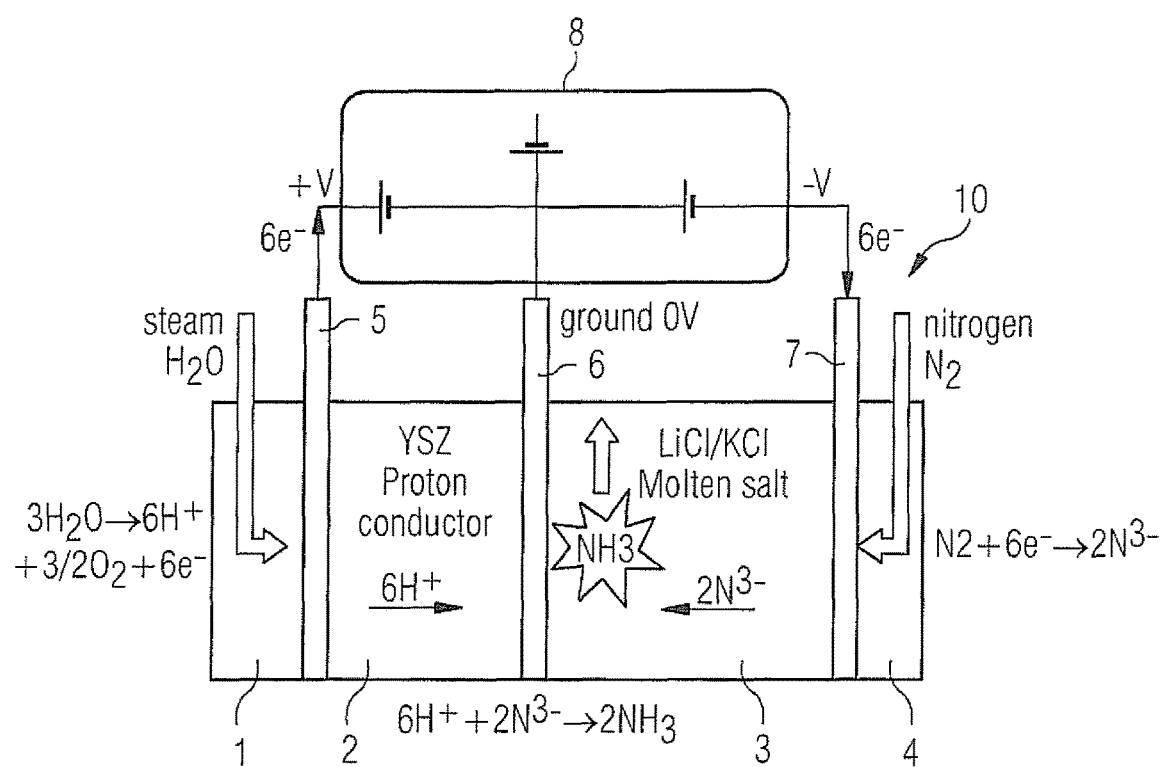

ELECTROCHEMICAL CELL

BACKGROUND OF THE INVENTION

Field of the Invention

The present invention relates to electrochemical cells, particularly hybrid electrochemical cells for synthesis of ammonia $NH_3$.

Description of the Prior Art

Known approaches to the requirement for synthesis of ammonia include:
(1) Haber Bosch process—pressurization and heating of $N_2$ and $H_2$ over an iron catalyst;
(2) Electrochemical synthesis with a molten salt electrolyte and gas electrodes [1-3]; and
(3) Electrochemical synthesis with a solid electrolyte and eletrocatalytic electrodes [4-6].
[1] Murakami T., T. Nishikiori, T. Nohira, and Y. Ito, "Electrolytic Synthesis of Ammonia in Molten Salts Under Atmospheric Pressure", J. Amer. Chem. Soc. 125 (2), pp. 334-335 (2003).
[2] Murakami T. et al., "Electrolytic Ammonia Synthesis from Water and Nitrogen Gas in Molten Salt Under Atmospheric Pressure", Electrochim. Acta 50 (27), pp. 5423-5426 (2005).
[3] U.S. Pat. No. 6,881,308 B2
[4] Marnellos, G., Zisekas, S., and Stoukides, M. (2000). Synthesis of ammonia at atmospheric pressure with the use of solid state proton conductors. J. Catal. 193, 80-88. doi:10.1006/jcat.2000.2877
[5] Lan, R., Irvine, J. T. S., and Tao, S. (2013). Synthesis of ammonia directly from air and water at ambient temperature and pressure. Sci. Rep. 3, 1145. doi: 10.1038/srep01145
[6] Skodra, A., and Stoukides, M. (2009). Electrocatalytic synthesis of ammonia from steam and nitrogen at atmospheric pressure. Solid State Ionics 180, 1332-1336.

SUMMARY OF THE INVENTION

The present invention seeks to provide alternative methods and apparatus for the synthesis of ammonia from water and nitrogen $N_2$.

The above object is achieved in accordance with the present invention by an arrangement for producing ammonia from first and second ionic components, wherein an electrochemical cell has four volumes, with a porous anode between a first volume and a second volume, a ground electrode between the second volume and a third volume, and a porous cathode between the third volume and a fourth volume. An introducer conduit introduces steam $H_2O$ into the first volume. An introducer conduit introduces nitrogen $N_2$ into the fourth volume. A first electrolyte is provided between the anode and the ground electrode, and a second electrolyte is provided between the cathode and the ground electrode.

The above object also is achieved by a method in accordance with the invention wherein an electrochemical cell as described above is used, with a positive voltage, with respect to the voltage of the ground electrode, being provided to the anode, and with a negative voltage, with respect to the voltage of the ground electrode, being applied to the cathode. Ammonia is thereby generated at the ground electrode by reaction between the protons $H^+$ and the nitride ions $N^{3-}$.

BRIEF DESCRIPTION OF THE DRAWINGS

The FIGURE illustrates an exemplary electrochemical cell as provided by an embodiment of the present invention.

DESCRIPTION OF THE PREFERRED EMBODIMENTS

In the embodiment of the invention shown in the FIGURE, an electrochemical cell 10 has four partitioned volumes 1-4. The first volume is a first chamber 1. In use, steam $H_2O$ is introduced into this first chamber. The second volume is a second chamber 2, which is a solid-state proton conductor. Possible proton conducting materials for the second chamber 2 include Y-doped BaZr03 (BZY) or yttria-stabilized zirconia (YZS), but other proton conducting materials may be employed. The third volume is a nitride conductor such as a molten salt eutectic, for example LiCl/KCl/$Li_3N$. Nitrogen $N_2$ is introduced into the fourth volume 4.

The whole electrochemical cell 10 may be operated at an elevated temperature. Three electrodes 5, 6, 7 are provided, and in use are connected to a split power supply 8 such that electrode 5 is an anode at a positive voltage of typically 0.5-2V; electrode 6 is at ground or virtual ground at 0V and electrode 7 is a cathode at a negative voltage of typically 0.5-2V.

Operation of the electrochemical cell 10 may proceed as follows. Anode electrode 5 is a porous electrode made from an electrocatalyst which receives steam $H_2O$ introduced into the first volume 1 and promotes the anode reaction:

$$3H_2O \Rightarrow 6H^+ + \tfrac{3}{2}O_2 + 6e^-.$$

The evolved oxygen gas $O_2$ may be collected as a by-product of the method of the present invention.

The protons $H^+$ are transported through the proton conducting electrolyte in second volume 2 to the ground electrode 6.

The cathode electrode 7 is a gas electrode made from a porous electrocatalyst which receives nitrogen $N_2$ introduced into the fourth volume 4 and promotes the cathode reaction:

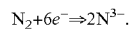

$$N_2 + 6e^- \Rightarrow 2N^{3-}.$$

The nitride ions $N^{3-}$ are transported through the nitride-conducting electrolyte in volume 3 to the ground electrode 6.

At the ground electrode 6 the $N^{3-}$ and $H^+$ ions combine to form ammonia $NH_3$ product which is given off as a gas and collected:

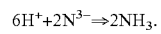

$$6H^+ + 2N^{3-} \Rightarrow 2NH_3.$$

The ground electrode 6 is made from a suitable material in order to facilitate this reaction, such as Ru, Rh or similar.

The structure of the electrochemical cell of the present invention allows steam $H_2O$ to be used as the source of hydrogen in the ammonia product, rather than hydrogen $H_2$ as is commonly the case in conventional methods and apparatus for synthesising ammonia. This enables the electrochemical synthesis of ammonia $NH_3$ without requiring a separate electrolysis stage to generate hydrogen $H_2$, or the need to buy and store hydrogen $H_2$, resulting in a much simpler system design.

A particular feature of the electrochemical cell of the invention and the attendant method of operation is the integration of the proton-conducting electrolyte and nitride-conducting electrolyte into a single system. The three-electrode electrochemical cell assembly 10 allows the processes of water electrolysis at the anode to generate protons $H^+$; the process of nitrogen gas reduction to nitride ions $N^{3-}$ at the cathode; and ammonia formation at the ground electrode 6 to be separated, allowing optimization of each process individually. Preferably, a split power supply 8 with (virtual) ground is used, to allow the separation of the processes. Alternatively, separate power supplies may be used, one between the anode 5 and ground 6, the other between ground 6 and the cathode 4.

While the present invention has been described with particular reference to the application of ammonia synthesis from steam and nitrogen gas, the electrochemical cell and the synthesis method, of the present invention may be applied to the production of other gaseous products from first and second ionic components. In general, an introducer conduit provided for introducing a first source material (in the above example, steam) into the first volume 1 and an introducer conduit is provided for introducing a second source material (in the above example, nitrogen) into the fourth volume; a first electrolyte is provided between the anode 5 and the ground electrode 6; a second electrolyte is provided between the cathode 7 and the ground electrode 6. Voltages +V and −V are applied respectively to the anode and cathode, with reference to a ground voltage at ground electrode 6. At the anode, a first ionic component (in the above example, $H^+$) is produced from the first source material. At the cathode, a second ionic component (in the above example, $N^{3-}$) is produced from the second source material. The first ionic component traverses the first electrolyte under the influence of the voltage gradient between the anode and the ground electrode, to reach the ground electrode. The second ionic component traverses the second electrolyte under the influence of the voltage gradient between the cathode and the ground electrode, to reach the ground electrode. The first ionic component and the second ionic component react at the ground electrode to form a product (in the above example, $NH_3$). A collector is provided to collect the product. Another collector may also be provided to collect any by-products generated at the anode or cathode.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. An arrangement for producing ammonia from first and second ionic components, comprising:
   an electrochemical cell comprising four volumes;
   a porous anode between a first volume and a second volume;
   a ground electrode between the second volume and the third volume;
   a porous cathode between the third volume and the fourth volume;
   an introducer conduit that introduces steam $H_2O$ into the first volume;
   an introducer conduit that introduces nitrogen $N_2$ into the fourth volume;
   a first electrolyte between the anode and the ground electrode;
   a second electrolyte between the cathode and the ground electrode; and
   at least one power supply that applies a positive voltage +V to the anode, with respect to the voltage of the ground electrode, and that applies a negative voltage −V to the cathode, with respect to the voltage of the ground electrode.

2. A method for production of ammonia using an electrochemical cell comprising four volumes, a porous anode between a first volume and a second volume, a ground electrode between the second volume and the third volume and a porous cathode between the third volume and the fourth volume, an introducer conduit that introduces steam $H_2O$ into the first volume, an introducer conduit that introduces nitrogen $N_2$ into the fourth volume, a first electrolyte between the anode and the ground electrode, a second electrolyte between the cathode and the ground electrode, said method comprising:
   applying a positive voltage +V to the anode, with respect to the voltage of the ground electrode;
   applying a negative voltage −V to the cathode, with respect to the voltage of the ground electrode;
   introducing steam $H_2O$ into the first volume, said steam $H_2O$ reacting at the anode to provide protons H+ in said first electrolyte in the second volume;
   introducing nitrogen $N_2$ into the fourth volume, said nitrogen $N_2$ reacting at the cathode to provide nitride ions $N^{3-}$ in said second electrolyte in the third volume; and
   generating ammonia at the ground electrode by reaction between the protons H+ and the nitride ions $N^{3-}$.

3. A method according to claim 2, further comprising collecting the ammonia produced at the ground electrode.

4. A method according to claim 2, further comprising collecting a by-product generated at the anode or the cathode.

* * * * *